United States Patent
Lee et al.

(10) Patent No.: US 12,266,816 B2
(45) Date of Patent: Apr. 1, 2025

(54) BATTERY TRANSPORT APPARATUS

(71) Applicant: LG ENERGY SOLUTION, LTD., Seoul (KR)

(72) Inventors: Dong-Hee Lee, Daejeon (KR); Sung-Guk Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 384 days.

(21) Appl. No.: 17/761,823

(22) PCT Filed: May 13, 2020

(86) PCT No.: PCT/KR2020/006287
§ 371 (c)(1),
(2) Date: Mar. 18, 2022

(87) PCT Pub. No.: WO2021/071041
PCT Pub. Date: Apr. 15, 2021

(65) Prior Publication Data
US 2022/0336906 A1  Oct. 20, 2022

(30) Foreign Application Priority Data

Oct. 11, 2019  (KR) .......................... 10-2019-0126476

(51) Int. Cl.
*H01M 50/00*  (2021.01)
*H01M 50/256*  (2021.01)

(52) U.S. Cl.
CPC ................................. *H01M 50/256* (2021.01)

(58) Field of Classification Search
CPC ............................ H01M 50/256; H01M 50/00
See application file for complete search history.

(56) References Cited

U.S. PATENT DOCUMENTS

| | | |
|---|---|---|
| 9,038,331 B2 | 5/2015 | Kawakatsu |
| 2012/0233850 A1 | 9/2012 | Hozumi et al. |
| 2012/0321381 A1 | 12/2012 | Ohgitani et al. |

FOREIGN PATENT DOCUMENTS

| | | |
|---|---|---|
| CN | 104081658 A | 10/2014 |
| CN | 107521827 A | 12/2017 |
| CN | 207828289 U | 9/2018 |
| CN | 109449496 A | 3/2019 |

(Continued)

OTHER PUBLICATIONS

Chang Shiuh-Ming, Dragging Apparatus Of Foldable Four-arm Spider Wheel (Geneva Wheel, Maltese Cross Gear), May 2012, See the Abstract. (Year: 2012).*

(Continued)

*Primary Examiner* — Anca Eoff
*Assistant Examiner* — Monique M Wills
(74) *Attorney, Agent, or Firm* — Birch, Stewart, Kolasch & Birch, LLP (57) ABSTRACT

A battery transporting apparatus includes a frame member configured to support a battery cell; a frame supporting adjustable member coupled to a lower side of the frame member to be adjustable in a width direction of the battery cell among length, width and thickness directions of the battery cell; a widthwise mover coupled to the frame supporting adjustable member to move the frame supporting adjustable member; and a support coupled to the frame supporting adjustable member.

10 Claims, 7 Drawing Sheets

(56) References Cited

FOREIGN PATENT DOCUMENTS

| CN | 209177431 U | * | 7/2019 | ............ H01M 50/00 |
|---|---|---|---|---|
| EP | 3 447 821 A1 | | 2/2019 | |
| JP | 6-105404 A | | 4/1994 | |
| JP | 2012-192783 A | | 10/2012 | |
| JP | 2013-1335 A | | 1/2013 | |
| KR | 20-1999-0018877 U | | 6/1999 | |
| KR | 10-2004-0090744 A | | 10/2004 | |
| KR | 10-2014-0087780 A | | 7/2014 | |
| KR | 10-1521267 B1 | | 5/2015 | |
| KR | 10-2015-0144608 A | | 12/2015 | |
| KR | 20170075465 A | * | 7/2017 | ............. B62B 5/028 |
| KR | 10-2017-0108378 A | | 9/2017 | |
| KR | 10-2017-0114852 A | | 10/2017 | |
| KR | 10-2019-0008698 A | | 1/2019 | |
| TW | M428179 U | * | 5/2012 | ............... B65G 7/00 |

OTHER PUBLICATIONS

Lee, Handle-type Heavy-goods Conveying Device Capable Of Flat Operation, Jul. 2017, See the Abstract. (Year: 2017).*
Li et al., For Transport Platform And Transport Vehicle Of Transporting The Battery Module, Jul. 2019, See the Abstract. (Year: 2019).*
International Search Report for PCT/KR2020/006287 mailed on Aug. 24, 2020.

* cited by examiner

BATTERY TRANSPORT APPARATUS

TECHNICAL FIELD

The present application claims priority to Korean Patent Application No. 10-2019-0126476 filed on Oct. 11, 2019 in the Republic of Korea, the disclosures of which are incorporated herein by reference.

The present disclosure relates to a battery transporting apparatus, and more particularly, to a battery transporting apparatus capable of adjusting a height in a width direction among length, width and thickness directions of a battery cell.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery (hereinafter, just referred to as a "battery") includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

Meanwhile, in a battery production line, a battery transporting device capable of receiving a large amount of thin batteries upright is used as a means for safely storing and transporting batteries when moving from a process to a process or when shipping finished products.

A conventional battery transporting device has a problem in that it is inconvenient to adjust an interval between main cassettes since a worker directly moves the main cassettes after releasing a bolt and nut and also the worker fixes the bolt and nut again after moving the main cassettes.

In particular, the conventional battery transporting device may be adjusted by a manual operation of the worker as described above only in a length direction of the battery cell among length, width and thickness directions of the battery cell, and the conventional battery transporting device is not movable in a width direction, namely in a height direction. Thus, it is difficult to adjust the height of the battery when charging or discharging the battery for a charging or discharging device with various heights.

DISCLOSURE

Technical Problem

Therefore, the present disclosure is directed to providing a battery transporting apparatus, which may move in a width direction, namely in a height direction, among length, width and thickness directions of the battery cell.

Technical Solution

In one aspect of the present disclosure, there is provided a battery transporting apparatus, comprising: a frame member configured to support a battery cell; a frame supporting adjustable member coupled to a lower side of the frame member to be adjustable in a width direction of the battery cell among length, width and thickness directions of the battery cell; a widthwise mover coupled to the frame supporting adjustable member to move the frame supporting adjustable member; and a support coupled to the frame supporting adjustable member.

Also, the frame supporting adjustable member may include a first adjustable member having a first end coupled to the widthwise mover and a second end coupled to the frame member; and a second adjustable member disposed to intersect with the first adjustable member and coupled to the first adjustable member, the second adjustable member having a first end coupled to the frame member and a second end coupled to the support.

In addition, the first adjustable member and the second adjustable member may be formed with a straight shape to intersect with each other at center portions thereof and be fixed at the center portions.

Also, the support may have a first guide hole formed in a direction perpendicular to the width direction, and the first end of the first adjustable member may be inserted into the first guide hole to move along the first guide hole and the second end of the first adjustable member may move in the width direction.

In addition, the widthwise mover may include a moving member coupled to the first adjustable member to move in a direction perpendicular to the width direction; a rotary shaft coupled to the moving member; and a rotating member coupled to the rotary shaft to rotate the rotary shaft.

Also, a female thread may be formed at an inner surface of the moving member and a male thread may be formed at an outer surface of the rotary shaft, and the male thread of the rotary shaft may be rotatably coupled to the female thread of the moving member.

In addition, the battery transporting apparatus may further comprise a guide plate coupled to the frame member at a lower side of the frame member, a second guide hole may be formed in the guide plate in a direction perpendicular to the width direction, the second end of the second adjustable member may be coupled to the support, and the first end of the second adjustable member may be inserted into the second guide hole and move in a horizontal direction along the second guide hole to move the guide plate in the width direction.

Also, the rotating member may include a connector guide coupled and fixed to the support; a elastic member provided to contact the rotary shaft; and a connector inserted into the connector guide to press the elastic member so that the widthwise-elastic member is elastically contracted.

In addition, a perforated hole may be formed in the connector, a pressing bar may be provided in the width direction at an inner side of the connector, and the elastic member may be inserted into the perforated hole to be pressed by the pressing bar.

Also, the connector guide may include a first guide having an inner surface of a regular hexagonal shape; and a second guide having an inner surface of a circular shape, and the connector may include a first outer surface portion having a regular hexagonal shape to correspond to the first guide; and a second outer surface portion having a circular shape to correspond to the second guide.

Advantageous Effects

According to embodiments of the present disclosure, since the frame member supporting the battery cell is adjustable in the width direction, namely in the height direction, by the frame supporting adjustable member, the battery cell may be charged or discharged using one transporting device by moving in the width direction of the battery cell for a charging or discharging device having various heights.

In addition, since the frame supporting adjustable member moves in the width direction by the operation of the widthwise moving member, the frame supporting adjustable member may be moved easily.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 1:
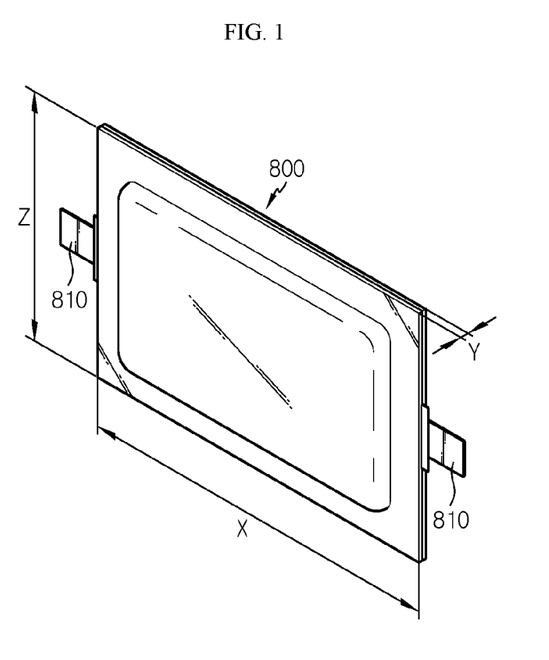
FIG. 1 is a schematic perspective view showing a battery cell that is transported by a battery transporting apparatus according to an embodiment of the present disclosure.
Figure 2:
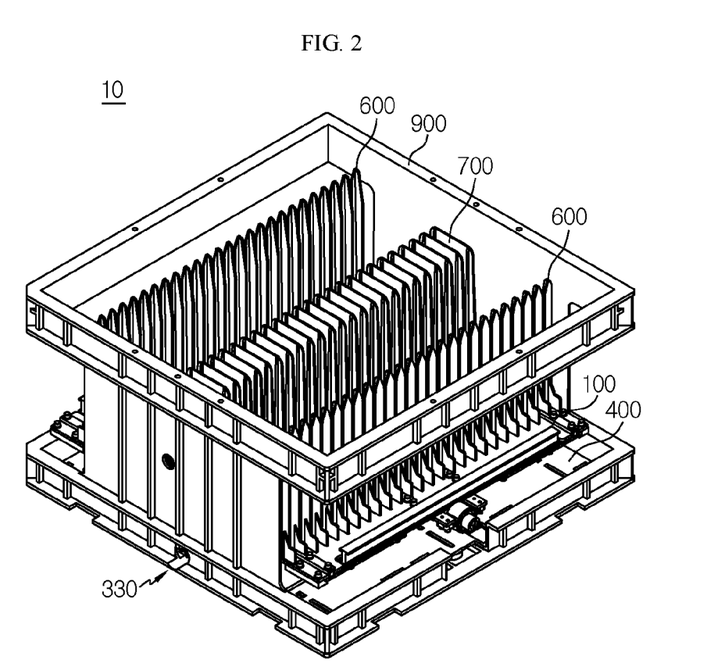
FIG. 2 is a perspective view showing the battery transporting apparatus according to an embodiment of the present disclosure entirely.
Figure 3:
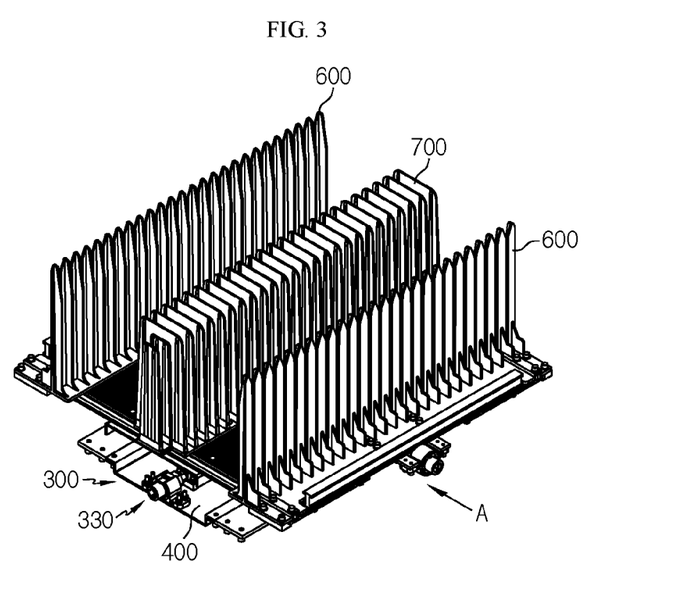
FIG. 3 is a perspective view showing a pair of electrode lead support members, a cell support member and a widthwise moving unit coupled to the frame supporting adjustable member of FIG. 2 from which a protecting member is removed.
Figure 4:
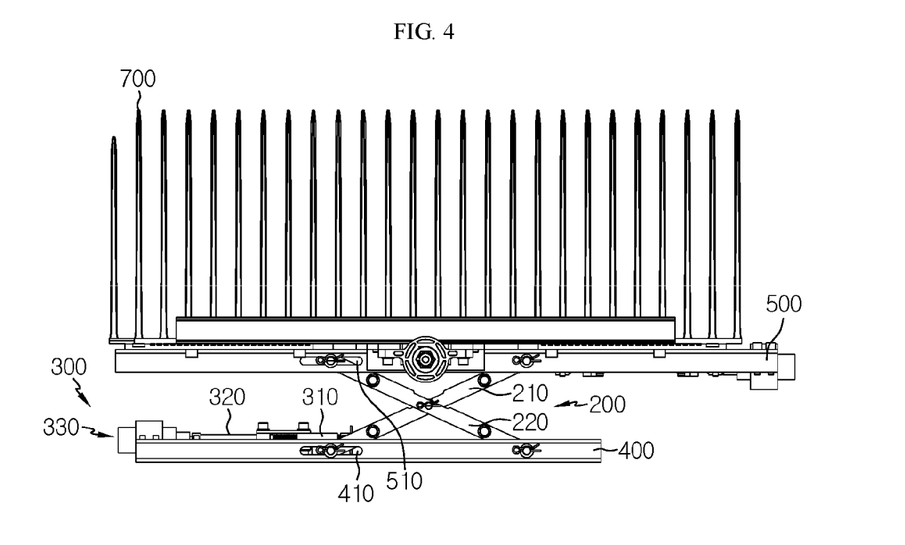
FIG. 4 is a diagram observed along an arrow A of FIG. 3, where the pair of electrode lead support members are removed in FIG. 3.
Figure 5:
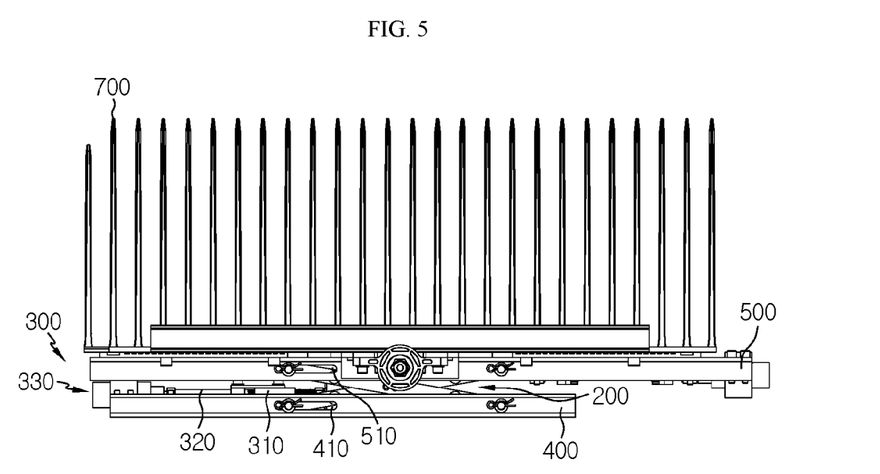
FIG. 5 is a diagram showing that a height is adjusted by moving the frame supporting adjustable member from FIG. 4.
Figure 6:
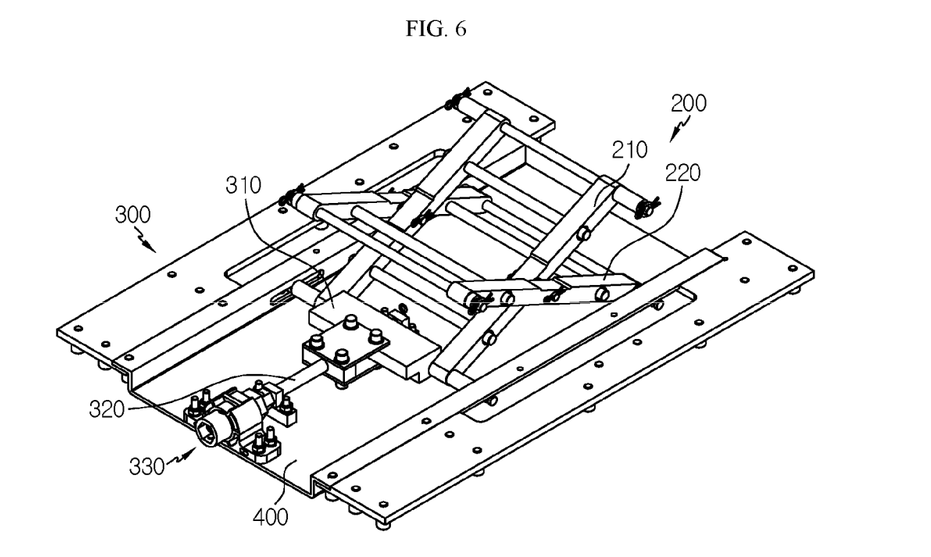
FIG. 6 is a perspective view showing a frame supporting adjustable member and a widthwise moving unit coupled to the support unit in the battery transporting apparatus according to an embodiment of the present disclosure.
Figure 7:
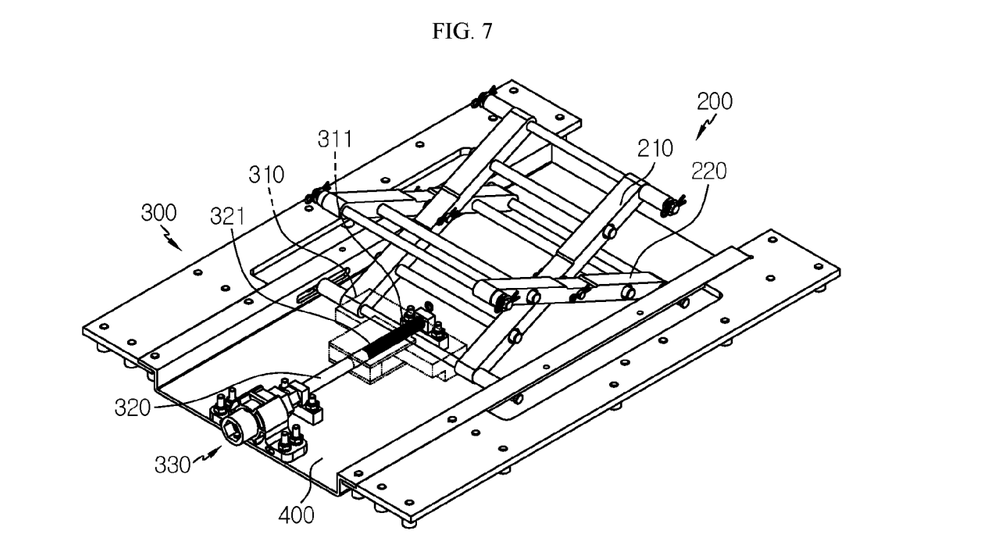
FIG. 7 is a diagram showing a male thread of the widthwise rotary shaft in FIG. 6.
Figure 8:
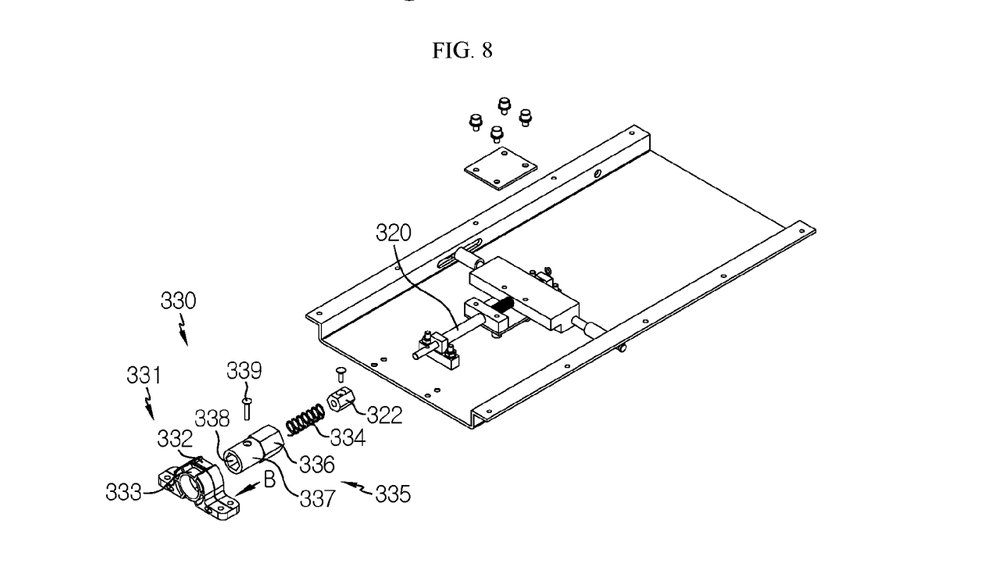
FIG. 8 is an exploded perspective view showing a widthwise rotating member of the battery transporting apparatus according to an embodiment of the present disclosure.
Figure 9:
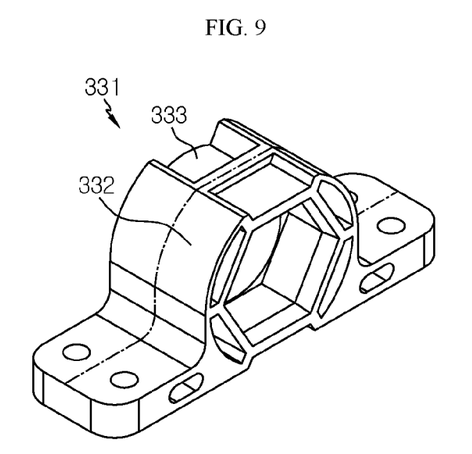
FIG. 9 is a diagram showing a widthwise connector guide along an arrow B in FIG. 8.
Figure 10:
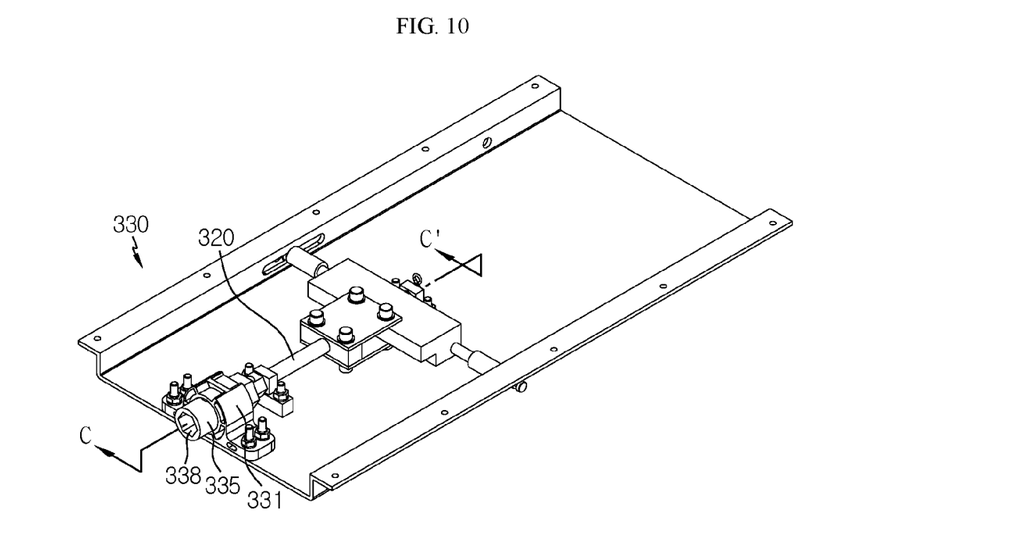
FIG. 10 is an assembled perspective view showing the widthwise rotating member of FIG. 8.
Figure 11:
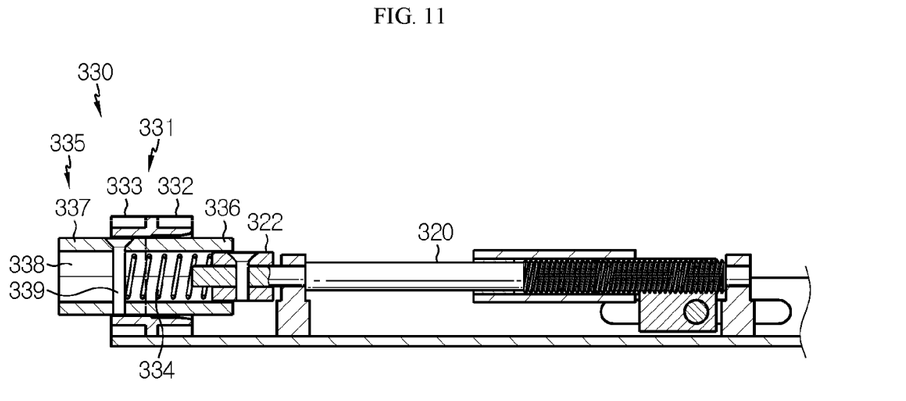
FIG. 11 is a cross-sectioned view, taken along the line C-C' of FIG. 10.
Figure 12:
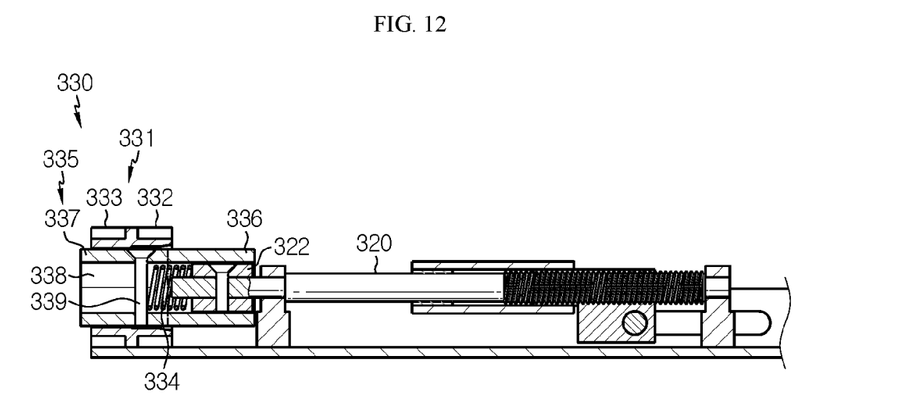
FIG. 12 is a cross-sectioned view showing that the widthwise connector is moved into the widthwise connector guide to operate the widthwise rotating member in FIG. 11.

FIG. 1 is a schematic perspective view showing a battery cell that is transported by a battery transporting apparatus according to an embodiment of the present disclosure, FIG. 2 is a perspective view showing the battery transporting apparatus according to an embodiment of the present disclosure entirely, FIG. 3 is a perspective view showing a pair of electrode lead support members, a cell support member and a widthwise moving unit coupled to the frame supporting adjustable member of FIG. 2 from which a protecting member is removed, FIG. 4 is a diagram observed along an arrow A of FIG. 3, where the pair of electrode lead support members are removed in FIG. 3, FIG. 5 is a diagram showing that a height is adjusted by moving the frame supporting adjustable member from FIG. 4, FIG. 6 is a perspective view showing a frame supporting adjustable member and a widthwise moving unit coupled to the support unit in the battery transporting apparatus according to an embodiment of the present disclosure, FIG. 7 is a diagram showing a male thread of the widthwise rotary shaft in FIG. 6, FIG. 8 is an exploded perspective view showing a widthwise rotating member of the battery transporting apparatus according to an embodiment of the present disclosure, FIG. 9 is a diagram showing a widthwise connector guide along an arrow B in FIG. 8, FIG. 10 is an assembled perspective view showing the widthwise rotating member of FIG. 8, FIG. 11 is a cross-sectioned view, taken along the line C-C' of FIG. 10, and FIG. 12 is a cross-sectioned view showing that the widthwise connector is moved into the widthwise connector guide to operate the widthwise rotating member in FIG. 11.

In this specification, a battery transporting apparatus 10 may have various forms, and may be formed as, for example, a battery transporting tray having a protecting member 900 (see FIG. 2). However, the present disclosure is not limited thereto.

Meanwhile, in this specification, length, width and thickness of a battery cell 800 will be described based on FIG. 1. That is, an X direction of FIG. 1 is a length direction of the battery cell 800, a Y direction of FIG. 1 is a thickness direction of the battery cell 800, and a Z direction of FIG. 1 is a width direction of the battery cell 800.

Referring to the drawings, the battery transporting apparatus 10 according to an embodiment of the present disclosure includes a frame member 100, a frame supporting adjustable member 200, a widthwise moving unit 300, and a support unit 400.

The battery transporting apparatus 10 according to an embodiment of the present disclosure is adjustable in a width direction of the battery cell 800 among length, width and thickness directions of the battery cell 800.

The frame member 100 is provided to support the battery cell 800. The battery cell 800 may have various structures, and an electrode lead 810 is provided thereto. The electrode lead 810 provided to the battery cell 800 is a type of terminal exposed to the outside and connected to an external device, and may be made of a conductive material.

The electrode lead 810 includes a positive electrode lead and a negative electrode lead. The positive electrode lead and the negative electrode lead may be disposed in opposite directions with respect to the length direction of the battery cell 800, or the positive electrode lead and negative electrode lead may be disposed in the same direction with respect to the length direction of the battery cell 800.

The electrode lead 810 may be electrically coupled to a bus bar. The battery cell 800 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 800 may be provided in various forms, but for convenience of explanation, it will be described that the battery cell 800 is a pouch-type battery cell as shown in FIG. 1.

The frame member 100 may support the battery cell 800 in various ways. For example, an electrode lead support member 600 may be mounted to the frame member 100, and the electrode lead support member 600 mounted to the frame member 100 may be configured to support the electrode lead 810 of the battery cell 800. Here, the electrode lead support member 600 may be configured to be fixed or adjustable. In addition, if a cell support member 700 is further provided, the cell support member 700 may be mounted to the frame member 100 to support a center portion of the battery cell 800. Here, the cell support member 700 may be configured to be fixed or adjustable.

The frame member 100 may be formed in various shapes. For example, the frame member 100 may be formed as a plate of a square shape. However, the shape of the frame member 100 is not limited thereto, and the frame member 100 may be provided in a divided form.

Referring to FIGS. 4 and 5, the frame supporting adjustable member 200 is coupled to a lower side of the frame member 100 and is configured to be adjustable in the width direction of the battery cell 800 among length, width and thickness directions of the battery cell 800.

The frame supporting adjustable member 200 may include a first adjustable member 210 and a second adjustable member 220. One side of the first adjustable member 210 is coupled to the widthwise moving unit 300, and the other side is coupled to the frame member 100. In addition, the second adjustable member 220 is disposed to intersect with the first adjustable member 210 and is coupled to the first adjustable member 210, so that one side thereof is coupled to the frame member 100 and the other side thereof is coupled to the support unit 400.

The first adjustable member 210 and the second adjustable member 220 may be formed in various ways. For example, the first adjustable member 210 and the second adjustable member 220 may be formed in a straight shape to intersect with each other at center portions thereof, so that the first adjustable member 210 and the second adjustable member 220 are fixed at the intersecting center portion. Accordingly, the first adjustable member 210 and the second adjustable member 220 may be formed in an approximately X-shape, without being limited thereto.

The widthwise moving unit 300 is coupled to the frame supporting adjustable member 200 to move the frame supporting adjustable member 200.

Referring to FIGS. 6 and 7, the widthwise moving unit 300 may include a widthwise moving member 310, a widthwise rotary shaft 320, and a widthwise rotating member 330.

The widthwise moving member 310 may be coupled to the first adjustable member 210 of the frame supporting adjustable member 200 to move in a direction perpendicular to the width direction, for example in a horizontal direction based on FIG. 6.

The widthwise rotary shaft 320 is coupled to the widthwise moving member 310. Here, a female thread 311 may be formed at an inner surface of the widthwise moving member 310, a male thread 321 may be formed at an outer surface of the widthwise rotary shaft 320, and the male thread 321 of the widthwise rotary shaft 320 may be rotatably coupled to the female thread 311 of the widthwise moving member 310.

The widthwise rotating member 330 is coupled to the widthwise rotary shaft 320 to rotate the widthwise rotary shaft 320. If the widthwise rotary shaft 320 is coupled to the widthwise rotating member 330 and rotates, the widthwise moving member 310 coupled to the widthwise rotary shaft 320 moves in a direction perpendicular to the width direction.

The support unit 400 is coupled to the frame supporting adjustable member 200 to support the frame supporting adjustable member 200.

A first guide hole 410 may be formed in the support unit 400 in a direction perpendicular to the width direction. Here, one end of the first adjustable member 210 is inserted into the first guide hole 410 to move along the first guide hole 410, and the other end of the first adjustable member 210 moves in the width direction. In addition, the frame member 100 coupled to the first adjustable member 210 also moves in the width direction.

Since the second adjustable member 220 is fixed to and intersects with the first adjustable member 210 at the center portion thereof, the second adjustable member 220 also operates in association with the operation of the first adjustable member 210. That is, the second adjustable member 220 also moves the frame member 100 in the width direction.

Referring to FIGS. 4 and 5, a guide plate 500 may be coupled to the frame member 100 at a lower side of the frame member 100. In this case, one side of the first adjustable member 210 is coupled to the widthwise moving unit 300, and the other side thereof is coupled to the guide plate 500.

A second guide hole 510 may be formed in the guide plate 500 in a direction perpendicular to the width direction. Here, one end of the second adjustable member 220 is coupled to the support unit 400, and the other end of the second adjustable member 220 is inserted into the second guide hole 510 and moves in a horizontal direction along the second guide hole 510 to move the guide plate 500 in the width direction.

The widthwise rotating member 330 is coupled to the widthwise rotary shaft 320 to rotate the widthwise rotary shaft 320. The widthwise rotary shaft 320 may be rotated in various ways. A worker may manually rotate the widthwise rotary shaft 320, or a tool may be used to rotate the widthwise rotary shaft 320. Alternatively, the widthwise rotating member 330 may be coupled to the widthwise rotary shaft 320, and the widthwise rotary shaft 320 may be rotated by means of the widthwise rotating member 330.

One side of the widthwise rotary shaft 320 is coupled to the widthwise moving member 310, and the other side of the widthwise rotary shaft 320 is coupled to the widthwise rotating member 330. In addition, if the widthwise rotating member 330 rotates, the widthwise rotary shaft 320 also rotates in association with the rotation of the widthwise rotating member 330.

Referring to FIG. 8, the widthwise rotating member 330 may include a widthwise connector guide 331, a widthwise elastic member 334, and a widthwise connector 335.

The widthwise connector guide 331 is coupled and fixed to the support unit 400.

The widthwise connector guide 331 may include a widthwise first guide 332 and a widthwise second guide 333. The widthwise first guide 332 may have an inner surface of a polygonal shape. For example, referring to FIG. 9, the widthwise first guide 332 may have an inner surface of a regular hexagonal shape. Hereinafter, for convenience of description, it will be described that the inner surface of the widthwise first guide 332 has a regular hexagonal shape, but the present disclosure is not limited thereto.

In addition, referring to FIG. 8, the widthwise second guide 333 may have an inner surface of a circular shape. Here, the widthwise first guide 332 and the widthwise second guide 333 may be in an integrated form or may be detachably formed.

The widthwise elastic member 334 is inserted into the widthwise connector 335 to contact the widthwise rotary shaft 320. The widthwise elastic member 334 transmits an elastic recovery force to the widthwise connector 335. This will be described later in detail.

The widthwise connector 335 is inserted into the widthwise connector guide 331 and presses the widthwise elastic member 334 so that the widthwise elastic member 334 is elastically contracted. For example, a perforated hole 338 is formed in the widthwise connector 335, and a widthwise elastic member 334 is inserted into the perforated hole 338. In addition, a pressing bar 339 is provided in the vertical direction at an inner side of the widthwise connector 335. As shown in FIG. 12, when the widthwise connector 335 is inserted into the widthwise connector guide 331, the pressing bar 339 presses the widthwise elastic member 334.

A widthwise first outer surface portion 336 and a widthwise second outer surface portion 337 may be formed at the widthwise connector 335. The widthwise first outer surface portion 336 has an outer surface of a regular hexagonal shape to correspond to the widthwise first guide 332. Here, the outer surface of the widthwise first outer surface portion 336 is not limited to the regular hexagonal shape and may have various shapes to correspond to the shape of the inner surface of the widthwise first guide 332. In addition, the widthwise second outer surface portion 337 has an outer surface of a circular shape to correspond to the widthwise second guide 333.

If a tool such as a hexagonal wrench is coupled to the widthwise connector 335 to give a pressure, the pressing bar 339 provided to the widthwise connector 335 elastically contracts the widthwise elastic member 334 as shown in FIG. 12, and the widthwise second outer surface portion 337 having an outer surface of a circular shape moves to the widthwise first guide 332. Here, since the widthwise first outer surface portion 336 having an outer surface of a regular hexagonal shape moves from the widthwise first guide 332, the widthwise connector 335 may be rotated.

At this time, a hexagonal coupling portion 322 having a regular hexagonal shape is formed at the end of the widthwise rotary shaft 320, and a regular hexagon is also formed at the widthwise connector 335 to which the hexagonal coupling portion 322 of the widthwise rotary shaft 320 is coupled. That is, at least a portion of the perforated hole 338 of the widthwise connector 335, for example a portion coupled to the hexagonal coupling portion 322 of the widthwise rotary shaft 320, is formed to have a regular hexagonal shape.

Therefore, if a tool such as a hexagonal wrench is coupled to the widthwise connector 335 to give a pressure, the perforated hole 338 of the widthwise connector 335 formed in a regular hexagonal shape moves so as to be coupled to the hexagonal coupling portion 322 of the widthwise rotary shaft 320 more deeply (see FIGS. 11 and 12).

In addition, if the widthwise connector 335 is rotated using a tool such as a hexagonal wrench, the widthwise rotary shaft 320 coupled to the widthwise connector 335 also rotates together with the widthwise connector 335.

In addition, if the widthwise rotary shaft 320 stops rotating, the hexagonal wrench is removed from the widthwise connector 335. If the hexagonal wrench is removed from the widthwise connector 335, in a state where the widthwise elastic member 334 is in contact with the pressing bar 339 of the widthwise connector 335, the elastic recovery force of the widthwise elastic member 334 is provided to the pressing bar 339 as shown in FIG. 11. Thus, the widthwise first outer surface portion 336 of the widthwise connector 335 is moved to and inserted into the widthwise first guide 332 of the widthwise connector guide 331.

Here, since the outer surface of the widthwise first outer surface portion 336 has a regular hexagonal shape and the inner surface of the widthwise first guide 332 also has a regular hexagonal shape, if the widthwise first outer surface portion 336 is inserted into the widthwise first guide 332, the widthwise first outer surface portion 336 is prevented from rotating. That is, if the hexagonal wrench is removed from the widthwise connector 335, the widthwise connector 335 is caught by the widthwise connector guide 331 to prevent rotation, and the widthwise rotary shaft 320 coupled to the widthwise connector 335 is prevented from rotating.

That is, if the widthwise connector 335 is rotated using a tool such as a hexagonal wrench, the widthwise rotary shaft 320 also rotates together with the widthwise connector 335, so the height of the frame member 100 is adjusted. However, if the tool such as a hexagonal wrench is removed from the widthwise connector 335, the widthwise first outer surface portion 336 of the widthwise connector 335 is coupled to the widthwise first guide 332 of the widthwise connector guide 331 to prevent the widthwise rotary shaft 320 from rotating.

According to the above configuration, since the frame member supporting the battery cell is adjustable in the width direction, namely in the height direction, by the frame supporting adjustable member, it is possible to charge or discharge the battery cell through one transporting device by moving the battery cell in the width direction of the battery cell, for charging or discharging devices having various heights.

In addition, since the frame supporting adjustable member moves in the width direction by the operation of the widthwise moving member, the frame supporting adjustable member may be moved easily.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery transporting apparatus, and may be used in industries related to batteries.

What is claimed is:

1. A battery transporting apparatus, comprising:
a frame member configured to support a battery cell;
a frame supporting adjustable member coupled to a lower side of the frame member to be adjustable in a width direction of the battery cell among length, width and thickness directions of the battery cell;
a widthwise mover coupled to the frame supporting adjustable member to move the frame supporting adjustable member; and
a support coupled to the frame supporting adjustable member,
wherein the frame supporting adjustable member includes:
a first adjustable member having a first end coupled to the widthwise mover and a second end coupled to the frame member; and
a second adjustable member disposed to intersect with the first adjustable member and coupled to the first adjustable member, the second adjustable member having a first end coupled to the frame member and a second end coupled to the support.

2. The battery transporting apparatus according to claim 1,
wherein the first adjustable member and the second adjustable member are formed with a straight shape to intersect with each other at center portions thereof and are fixed at the center portions.

3. The battery transporting apparatus according to claim 2,
wherein the support has a first guide hole formed in a direction perpendicular to the width direction, and
wherein the first end of the first adjustable member is inserted into the first guide hole to move along the first guide hole and the second end of the first adjustable member moves in the width direction.

4. The battery transporting apparatus according to claim 3,
wherein the widthwise mover includes:
a moving member coupled to the first adjustable member to move in a direction perpendicular to the width direction;
a rotary shaft coupled to the moving member; and
a rotating member coupled to the rotary shaft to rotate the rotary shaft.

5. The battery transporting apparatus according to claim 4,
wherein a female thread is formed at an inner surface of the moving member and a male thread is formed at an outer surface of the rotary shaft, and
wherein the male thread of the rotary shaft is rotatably coupled to the female thread of the moving member.

6. The battery transporting apparatus according to claim 5, further comprising:
a guide plate coupled to the frame member at a lower side of the frame member,
wherein a second guide hole is formed in the guide plate in a direction perpendicular to the width direction, and
wherein the second end of the second adjustable member is coupled to the support, and the first end of the second adjustable member is inserted into the second guide hole and moves in a horizontal direction along the second guide hole to move the guide plate in the width direction.

7. The battery transporting apparatus according to claim 6,
wherein the rotating member includes:
a connector guide coupled and fixed to the support;
an elastic member provided to contact the rotary shaft; and
a connector inserted into the connector guide to press the elastic member so that the elastic member is elastically contracted.

8. The battery transporting apparatus according to claim 7,
wherein a perforated hole is formed in the connector, a pressing bar is provided in the width direction at an inner side of the connector, and the elastic member is inserted into the perforated hole to be pressed by the pressing bar.

9. The battery transporting apparatus according to claim 8,
wherein the connector guide includes:
a first guide having an inner surface of a regular hexagonal shape; and
a second guide having an inner surface of a circular shape,
wherein the connector includes:
a first outer surface portion having a regular hexagonal shape to correspond to the first guide; and
a second outer surface portion having a circular shape to correspond to the second guide.

10. A battery transporting apparatus, comprising:
a frame member configured to support a battery cell;
a frame supporting adjustable member coupled to a lower side of the frame member to be adjustable in a width direction of the battery cell among length, width and thickness directions of the battery cell;
a widthwise mover coupled to the frame supporting adjustable member to move the frame supporting adjustable member; and
a support coupled to the frame supporting adjustable member,
wherein the frame supporting adjustable member includes:
a first adjustable member having a first end coupled to the widthwise mover and a second end coupled to the frame member; and
a second adjustable member disposed to intersect with the first adjustable member and coupled to the first adjustable member, the second adjustable member having a first end coupled to the frame member and a second end coupled to the support, and
wherein the widthwise mover includes:
a moving member coupled to the first adjustable member to move in a direction perpendicular to the width direction;
a rotary shaft coupled to the moving member; and
a rotating member coupled to the rotary shaft to rotate the rotary shaft.

* * * * *